United States Patent [19]
Malinowski

[11] Patent Number: 4,877,112
[45] Date of Patent: Oct. 31, 1989

[54] BICYCLE BRAKE CABLE ASSEMBLY
[75] Inventor: Roger A. Malinowski, Newport Beach, Calif.
[73] Assignee: Malcom Smith Products, Riverside, Calif.
[21] Appl. No.: 246,428
[22] Filed: Sep. 19, 1988
[51] Int. Cl.$^4$ .............................................. B62L 3/02
[52] U.S. Cl. ................................. 188/24.22; 74/502.2; 74/519
[58] Field of Search .................... 74/502.2, 502.6, 519; 188/2 D, 24.14, 24.15, 24.21, 24.22

[56] References Cited
FOREIGN PATENT DOCUMENTS

| 0406487 | 1/1910 | France ............................... | 188/24.21 |
| 0028852 | 8/1903 | Switzerland ..................... | 188/24.21 |

OTHER PUBLICATIONS
ODYSSEY Installation Manual PRO Steer System; STM-BC V.A.P.O.R. Stem, author unknow. pp. 1 and 2, date and place of publication unknown.

*Primary Examiner*—Duane A. Reger

[57] ABSTRACT

A brake cable assembly including a substantially vertical shaft, an elongate arm extending substantially outward from the shaft, a clamp secured to one end of the arm opposite the shaft for securing and supporting a pair of handlebars, a housing extending from the shaft or arm, including a pair of sides horizontally spaced from one another, a pin, at least a portion of which is secured between the sides of the housing defining an axis of rotation, and a device mounted on and rotatable about said pin, such device including a generally triangular body including a horizontal bore having a diameter larger than the diameter of the pin through which the pin extends, a first fork extending from the body for retaining the end of a brake cable connected to the brake lever, the first fork including a pair of curved prongs, wherein the space between the prongs of the first fork forms a vertical slot and one side of the prongs of the first fork forms a partial cylindrical surface and a second fork, spaced from the first fork, extending from the body for retaining the end of a break cable connected to a brake caliper, the second fork including a pair of curved prongs, wherein the space between the prongs of the second fork forms a vertical slot, the sides of the prongs of the second fork facing the first fork, forming a partial cylindrical surface, wherein the ratio of the distance between the axis of rotation and the axis of the partial cylindrical surface formed by the prongs of the first fork and the distance between the axis of rotation and the axis of the partial cylindrial surface formed by the prongs of the second fork is between 7 to 6 and 3 to 2.

4 Claims, 1 Drawing Sheet

BICYCLE BRAKE CABLE ASSEMBLY

This invention relates generally to bicycle components and, in particular, to an improved bicycle brake cable assembly.

Although bicycles have long been a popular mode of on-road transportation and recreation, in the past several years, bicycles have become increasingly popular as a means of off-road transportation. As standard on-road bicycles were not designed for the rigors of off-road biking, a new generation of "mountain bikes" have been developed to meet the needs of the off-road riders. These mountain bikes typically are provided with wider and heavier rims and tires than standard bicycles, along with a heavier frame.

Mountain biking enthusiasts are particularly fond of riding through hilly terrain, finding the skill and endurance necessary for such activity more of a challenge than riding over flat surfaces. To avoid falls while riding over the steep slopes, rocks and ruts confronted by the mountain biker, the biker must maintain a firm, two-handed grip on the handlebars at virtually all times. Unfortunately, it is typically necessary for the biker to at least partially release his or her grip on the handlebars when shifting or braking the bicycle, sometimes leading to falls.

In recognition of the desirability of the rider maintaining a firm two-handed grip on the handlebars at all times, a number of novel gear shifting mechanisms have been developed, including mechanisms which shift when the handlebars are twisted in a certain manner, and a number of "automatic" transmissions to enable the rider to shift gears without releasing his or her grip on the handlebars. However, due to the critical need for complete control of the bicycle brakes while rushing down a steep slope, along with the potentially disastrous consequences of inadvertently actuating the brake mechanism, neither automatic brake actuators or brake actuators integral with the bicycle handlebars have gained popularity among mountain bikers.

As a mountain biker typically gains the most speed on a down slope, the brake mechanism utilized in connection with the front wheel of the bicycle is particularly important. Most front brake mechanisms utilize an elongate lever, slightly longer than the width of the rider's hand, spaced outward from the handlebars which is secured to and rotates about a pivot secured within a housing to transfer the force from the rider's hand to one end of a coaxial brake sheath and cable for actuating the brake mechanism. The end of the brake cable is secured to the lever near the pivot and the end of the sheath is secured to a stop attached to the lever housing. The sheath extends from the lever housing to a second stop below the stem. The brake cable extends through the stop, along the arm of the stem, over a spool-shaped roller, and downward along the vertical shaft of the stem to a brake caliper arrangement. The caliper arrangement comprises two opposing plates lined with frictional pads that press against the sides of the rim of the bicycle to create sufficient friction between the brake pads and the rim to bring the bicycle to a stop. This arrangement transfers effectively the equivalent movement and force of the end of the brake cable at the brake lever housing to the brake caliper and is generally satisfactory for most on-road braking situations.

In an off-road context, however, it is often difficult for the rider to generate sufficient braking force to properly control the bike unless the rider exerts force with his entire hand on the brake lever. When a rider utilizes his or her entire hand to brake, however, it is often difficult for the rider to maintain a sufficiently tight grip on the bike's handlebars to control the bike without wrapping his hand entirely around both the handlebars and the brake lever. Although this technique is feasible when it is desired to bring the bike to a complete halt, most riders', hands are not large enough to be poised over the released brake lever and still maintain a firm grip on the handlebars.

One modification of the standard brake cable assembly is marketed by Odyssey of Carson, California, and includes a brake cable roller marketed under the mark VAPOR, which utilizes an integrally formed offset double spool roller in place of the standard single spool roller. The double spool roller includes a large diameter oval disk sandwiched between a pair of off-set smaller circular disks which overlap near the center of the larger disk. One edge of the larger disk between the smaller disks is cutout to form a crescent. In use, the brake cable extending from the brake lever is wrapped over and around the lower smaller disk within a circular groove between the disks. The cable is then bent around the cutout of the larger disk, where it is held tightly in place by a set screw. The cable is further wrapped around the upper smaller disk within a groove between the disks and extends downward along the shaft stem to the brake calipers.

Advertising for the device indicates that the device increases brake adjustability and power three-fold. Specifically, the advertising material indicates that "the variable assist feature allows you to set your brake shoes farther from the rim than ever before and still increase overall brake performance. Initial 1 to 3 ratio closes the gap quick, then changes to 1 to 1 for fine control."

Unfortunately, experience has shown that difficulties could be experienced with this device in controlling the brakes due to the variation in the amount of force communicated to the brake calipers for a given amount of force applied to the brake lever over the range of motion of the brake lever. Likewise, difficulties could be experienced with this device in controlling the brakes due to variations in the resulting amount of movement of the end of the brake cable secured to the brake calipers in response to a given amount of movement of the brake lever over the range of movement of the brake lever. Further, the wrapping of the brake cable around the VAPOR device requires that the brake cable be wrapped in a relatively tortured manner, and be clamped in place by a bolt. This could potentially cause fatigue of the brake cable at this location and, over time, cause excessive wear on the brake cable.

In view of the need to maintain a firm grip on the handlebars of a bicycle, particularly in off-road conditions, there is needed a reliable and inexpensive means of increasing the amount of force a rider is able to generate on the brake cables without decreasing his ability to maintain a grip on the handlebars of the bicycle.

SUMMARY OF THE INVENTION

Applicant's invention provides an improved bicycle brake cable assembly which amplifies the amount of force exerted on a first brake cable secured to the brake lever, thereby applying a greater amount of force to the end of a second brake cable connected to the brake calipers. The configuration and arrangement of the assembly is such that the degree of amplification provides improved braking force and "touch," without significantly diminishing the travel distance of the cable secured to the brake caliper relative the cable secured to the brake lever.

The assembly includes an item having a substantially vertical shaft, an elongate arm extending substantially horizontally outward from the shaft, and a clamp secured to the end of the arm opposite the shaft for securing and supporting a pair of handlebars. A housing extends from either the shaft or the arm for securing a pin which defines an axis of rotation. A device rotatably mounted on the pin includes a generally rectangular body and a first and second fork. The body is provided with a horizontal bore having a diameter larger than the diameter of the pin through which the pin extends. The first fork includes a pair of curved prongs for retaining a brake cable connected to the brake lever. The second fork is spaced from the first fork and includes a pair of curved prongs for retaining the brake cable connected to the brake caliper. Each fork defines a partial cylindrical surface having an axis. The ratio of the distance between the axis of the bore extending through bore extending through the triangular body and the axis of the partial cylindrical surface of the first fork, to the distance between the axis of the bore extending through the triangular body to the axis of the partial cylindrical surface defined by the second bore is between 7 to 6 and 3 to 2, and is preferably approximately 4 to 3.

One aspect of the invention is that the ratio of the force exerted on the brake cable connected to the brake caliper to the amount of force exerted on the brake cable by the brake lever is substantially constant throughout the range of motion of the assembly. This permits the rider to become accustomed to the amount of force applied in response to a given amount of pressure on the brake lever.

Another aspect of the invention is that through use of the brake lever assembly of the present invention, a given movement of the brake cable secured to the brake lever will correspond to a smaller movement of the brake cable secured to the brake calipers. This has the effect of improving the rider's "touch" for the brakes, thereby improving control. Preferably, the structure of the assembly is such that the ratio of the travel distance is between the brake cable secured to the brake lever and the brake cable connected to the brake yoke and/or brake calipers will not significantly diminish performance of the brakes.

DESCRIPTION OF THE DRAWINGS

These and other features of the invention will now be described with reference to drawings of the preferred embodiment which is intended to illustrate, and not to limit, the invention, and in which.

DESCRIPTION OF THE PREFERRED EMBODIMENT

Figure 1:
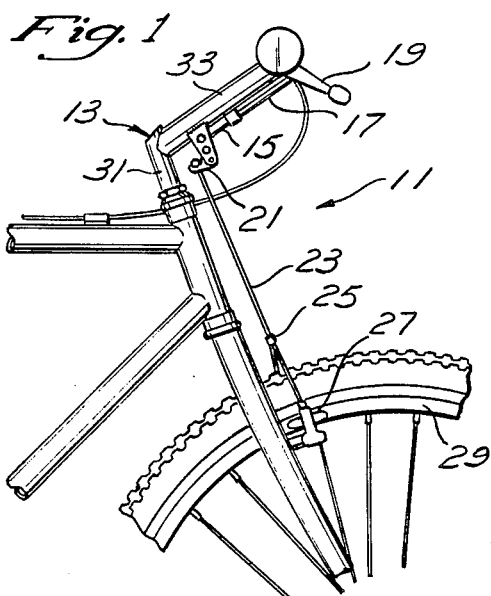
FIG. 1 is a partial perspective view of the stem, handlebars and front brake mechanism of a bicycle incorporating the brake cable assembly of the present invention.

Referring now to FIG. 1, there is shown the brake cable assembly 11 of the present invention. The assembly 11 includes a bicycle stem 13, a first coaxial brake cable 15 surrounded by a sheath 17 extending from a brake lever 19 to a brake cable device 21, and a second brake cable 23 extending from the device 21 to a yoke 25 connected to a brake caliper arrangement 27 adapted to frictionally brake the front wheel of a bicycle by applying force to the bicycle rim 29.

The stem 13 includes a substantially vertical, cylindrical shaft 31 and an elongate arm 33 extending substantially horizontally outward from the shaft 31 at approximately a 102° angle. Secured to one end of the arm 33, opposite the shaft 31, is a clamp for securing and supporting a pair of handlebars. The handlebars support a standard brake lever 19 and brake lever housing, with the housing including a stop for preventing the movement of a sheath 17 surrounding the first coaxial brake cable 15 from moving with the cable 15 in response to movement of the brake lever 19.

Figure 2:
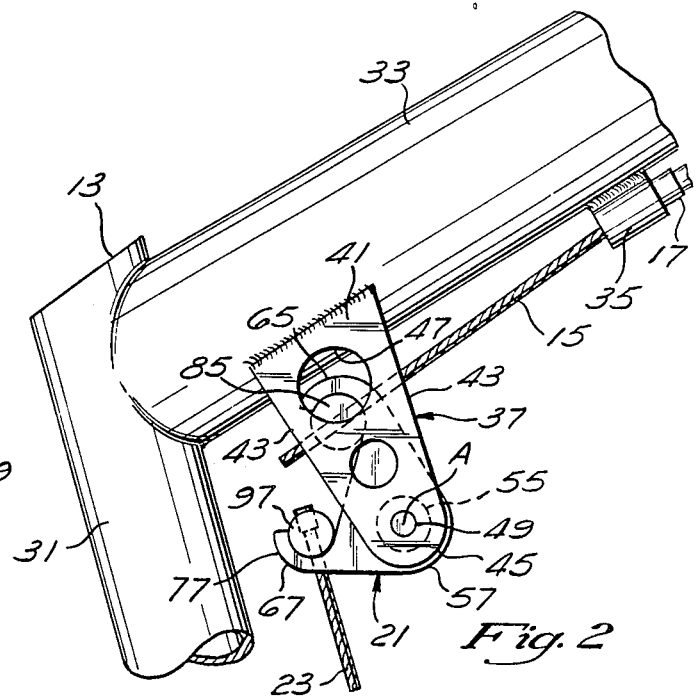
FIG. 2 is an enlarged partial side perspective view of the housing and device of the assembly of FIG. 1.
Figure 3:
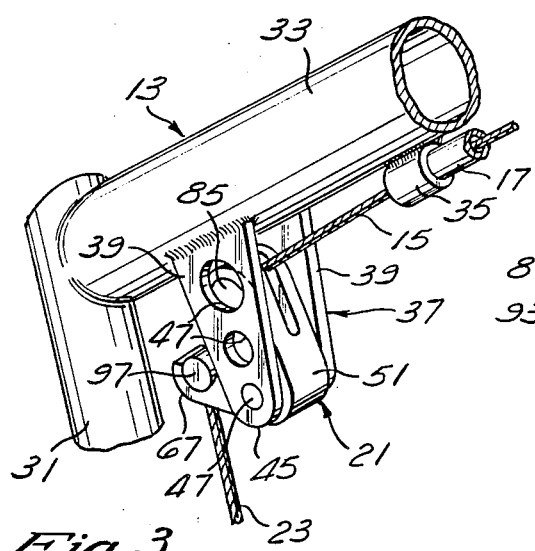
FIG. 3 is an enlarged partial perspective view of the housing and device of FIG. 1.

The sheath 17 and first cable 15 extend downward along the length of the arm 33 of the stem to a generally cylindrical stop 35 located roughly midway between the handlebar clamp and the junction of the arm 33 of the stem with the shaft 31. The sheath 17 terminates and is prevented from moving with the first cable 15 in response to movement of the brake lever 19 by the stop 35. As best seen in FIGS. 2 and 3, the brake cable 15 extends through the stop 35, along the arm 33, to a brake cable device 21.

The device 21 is secured to the arm 33 of the stem by a housing 37 comprising a pair of elongate, horizontally spaced sides. The respective sides 39 are identical in shape, and include a wide end 41, having a straight edge which is fixed to the arm 33 of the stem by suitable means such as welding, two elongate edges 43 which each taper inwardly along their length away from the arm 33 at an angle of approximately 15°, and a distal end 41 formed by an arcuate outer edge 45. Spaced along the length of each housing side 39, centered between the side's elongate edges 43 are three circular openings 47 of decreasing diameter, with the largest opening 47 being nearest the arm 33 and the smallest opening 47 being farthest away from the arm 33.

Figure 4:
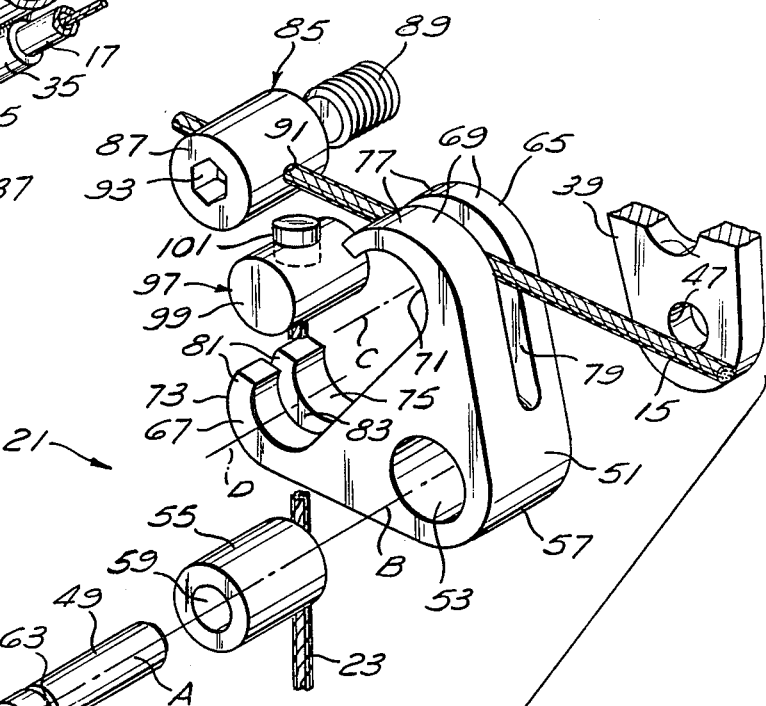
FIG. 4 is an enlarged, exploded perspective view of the assembly of FIG. 3.

Referring now to FIG. 2-4, the device 21 is secured between the sides 39 of the housing 37 by an elongate generally cylindrical pin 49 preferably having a length of about 18.4–18.8 mm and a diameter of about 4.10–4.25 mm, which extends through the smallest opening 47 of the respective sides 39 of the housing 37. The pin 49 has an axis A which corresponds to and defines a horizontal axis of rotation.

The device 21 has a generally triangular body 51 having a thickness slightly less than the distance between the respective sides 39 of the housing 37, preferably about 10.66–10.70 mm. One of the corners of the body 51 of the device 21 includes a bore 53 having an axis B, with a diameter, preferably about 8.90–8.97 mm, large enough to permit the bore 53 to receive an elongate cylindrical bushing 55 of brass or other suitable material. The exterior of the body 51 proximate the bore 53 forms an arcuate surface 57 having a radius of approximately 8 mm, centered at the axis B of the bore 53. The bushing 55 has a coaxial bore 59 with a diameter, preferably 5.10–5.2 mm, sightly larger than the external diameter of the pin 49, to permit the device 21 to rotate freely about the axis of rotation A defined by the pin 49. The pin 49 and the device 21 are secured within the sides 39 of the housing 37 by a C-clip 61 which is insertable into a groove 63 near one of the ends of the pin 49 between one of the sides 39 of the housing 37 and the device 21 to prevent the horizontal movement of the pin 49 relative the housing 37. Naturally, the device 21 could rotate about the pin 49 directly, but the use of the bushing 55 is desirable to prevent wear on the pin 49 and the device 21.

The device 21 includes a first fork 65 extending from a corner of the body 51 opposite the bore 53 for retaining the end of the brake cable 15 connected to the brake lever 19, and a second fork 67 extending from the opposite corner of the body 51 for retaining the end of a brake cable 23 connected to the brake caliper arrangement 27.

The first fork 65 has an arcuate outer surface 69 having a radius which varies between 19 mm and 7.2 mm as it extends towards the distal end of the fork. The fork further includes an interior partial cylindrical surface 71 having a radius of approximately 5.1–5.2 mm, and an axis C. The second fork 67 includes an external arcuate surface 73 having a varying radius and an internal partial cylindrical surface 75, having an axis D, preferably having a radius of about 4.2–4.3 mm. Desirably, the axis C of the first fork 65 is spaced to the left, as shown in FIG. 2, approximately 5.3–5.4 mm from a line tangent to the partial cylindrical surface 71 of the first fork 65 which intersects the axis of the bore 53, and about 19.9–20.0 mm above a line tangent to the partial cylindrical surface 75 of the second fork 67 which intersects the axis of the bore 53. Desirably, the axis D of the second fork 67 is approximately 15.19–15.29 mm from a line tangent to the partial cylindrical surface 71 of the first fork 65 intersecting the axis B of the bore 53, and spaced 4.3 mm above a line tangent to the partial cylindrical surface 75 of the second fork 67 intersecting the axis B of the bore 53. The resulting angle between the respective axes of the partial cylindrical surface 71 of the first fork 65 and the partial cylindrical surface 75 of the second fork 67 having an origin at the axis B of the bore 53 is approximately 60°.

The first fork 65 is split into a pair of prongs 77 by a vertical slot 79 spaced about 4.56–4.60 mm from the backside of the device 21, such slot 79 having a width of about 2.7–2.8 mm. The slot 79 extends downward (toward the bore 53) at approximately a 45° angle to a line tangent to the partial cylindrical surface 71 of the first fork 65 which intersects the axis B of the bore 53. Likewise, the second fork 67 is split into a pair of prongs 81 by a vertical slot 83 spaced about 5.32–5.46 mm from the front of the device 21 which extends downwards (towards the bore 53) at a 45° angle to a line tangent to the partial cylindrical surface 75 of the second fork 67, which intersects the axis B of the bore 53.

The first fork 65 curves inward towards the second fork 67 to a point approximately 45° from a line parallel to a line tangent to the partial cylindrical surface 71 of the first fork 65 which intersects the axis B of the bore 53 and intersects the axis C of the partial cylindrical surface 71 of the first fork 65.

The prongs 81 of the second fork 67 curve inward towards the prongs 77 of the first fork 65 to a point approximately 30° from a line parallel to a line tangent to the partial cylindrical surface 75 of the second fork 67 which intersects the axis B of the bore 53 and intersects the axis D of the partial cylindrical surface 75 of the second fork 67.

An important aspect of the invention, as will be discussed in greater detail below, is that the ratio of the perpendicular distance between the axis C of the partial cylindrical surface 71 of the first fork 65 and the axis B of the bore 53 to perpendicular distance from the axis D of the partial cylindrical surface 75 of the second fork 67 to the axis B of the bore 53 is between 7 to 6 and 3 to 2. Preferably, this ratio is approximately 4 to 3.

Figure 5:
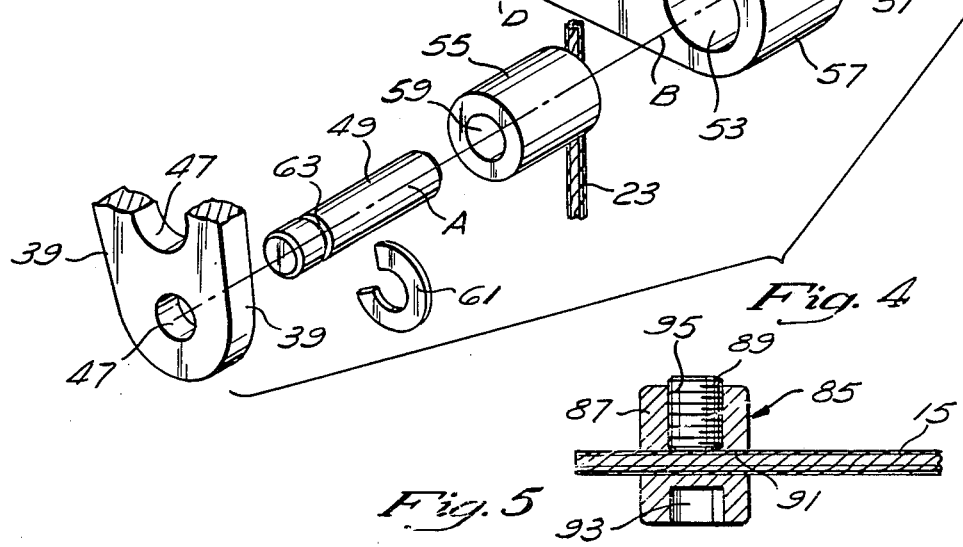
FIG. 5 is an enlarged, cut-away perspective view of the cable clamp of the assembly FIG. 1.

Referring now to FIGS. 4 and 5, the end of the first brake cable 15 opposite the brake lever 19 is secured within a cylindrical pinch clamp 85. The pinch clamp 85 and, therefore, the end of the first cable 15, is retained by the partial cylindrical surface 71 of the prongs 77 of the first fork 65, so that the cable 15 extends through the slot 79 of the first fork 65. The clamp 85 includes a cylindrical body 87 and a threaded screw 89 which can be threaded into the body 87 of the clamp 85 to secure a brake cable therein. The cylindrical body 87 is provided with (1) a throughbore 91 intersecting and extending perpendicular to the axis of the body 87 having a diameter slightly larger than the diameter of the brake cable 15, (2) a coaxial, hexagonal bore 93 extending through one end of the body 87 deep enough to permit the bore 93 to mate with an allen wrench, and (3) a coaxially internally threaded bore 95 extending through the other end of the body 87, which intersects the throughbore 91 of the body 87.

The second fork 67 retains the end of the brake cable 23 connected to the yoke 25, which is connected to the brake caliper arrangement 27. At the end of the second brake cable 23 opposite the yoke 25 is a standard ball and cylinder arrangement 97, which is well known in the art, and is provided on one end of all standard brake cables. Briefly, the end includes a cylinder 99 including a throughbore intersecting the axis of the cylinder 99 perpendicular to the cylinder axis, one end of which is counter sunk to receive the beaded end 101 of the brake cable 23, thereby retaining it within the cylinder 99. This ball and cylinder arrangement 97 and, therefore, the end of the second cable 23 opposite the yoke 25 is retained by the partial cylindrical surface 75 of the second fork 67, so that the cable 23 extends through the slot 83 of the second fork 67.

OPERATION

The operation of the brake cable assembly 11 will now be briefly described. When the brake lever 19 is depressed, the first brake cable 15 is pulled toward the brake lever 19 in the direction of the arrow shown in FIG. 2. This, in turn, causes the pinch clamp 85, retained by the first fork 65 of the device 21, to apply a force to the first fork 65 in the direction of the first cable 15, thereby causing the device 21 to rotate clockwise, as shown in FIG. 2. As the device 21 rotates, the second fork 67 applies a force upward in the direction of the second cable 23 connected to the brake yoke 25, shown in FIG. 3, thereby raising the yoke 25 and causing the brake caliper arrangement 27 to close against the rim 29 of the bicycle wheel. The force of the pinch clamp 85 on the first fork 65 and the force of the second fork 67 on the ball and cylinder 97 of the second cable 23 is applied over different areas during the rotation of the device 21. However, overall, due to the greater moment arm of the force applied by the pinch clamp 85 to the first fork 65, compared to the moment arm of the force applied by the second force on the ball and cylinder of the second cable 23 will be greater. Since the ratio of the lengths of the moment arm between the axis A of rotation and the brake cable 15 connected to the brake lever 19 and the moment arm between the axis A of rotation and the brake cable 23 connected to the yoke 25 are between 7 to 6 and 3 to 2, the actual amount of force communicated to the yoke 25 and, therefore, the brake calipers will be, roughly speaking, 116% to 150% of the force exerted by the brake lever 19.

Since the rider is able to apply greater braking force to the lever 19, the rider will often be able to apply sufficient force to the brake lever 19s to control the bike, with only two or three fingers. Furthermore, in emergency-stop situations, the rider will be able to apply greater force than formally possible with standard brake attachments, by depressing the brake lever 19 with all four fingers.

Although it would be possible to increase the magnification of the force applied to the brake lever 19, by further increasing the distance between the axis A of rotation and the axis C of the partial cylindrical surface 71 of the first fork 65 versus the distance between the axis A of rotation and the axis D of the partial cylindrical surface 75 of the second fork 67, since the relative ratio of brake cable travel between the brake lever cable 15 and the brake caliper cable 23 diminishes as the ratio of the forces increases, the distance of brake lever 19 travel required to obtain the desired amount of braking becomes undesirably large as the ratio between the moment arms increases beyond 3 to 2. Experience has shown that the optimum balance between amplification of force and brake lever 19 movement results when the ratio between the moment arm of the first fork 65 is roughly 1⅓ times as long as the moment arm of the second fork 67. It is also important that the ratio of the force exerted on the brake cable 23 connected to the brake caliper 27 to the amount of force exerted on the brake cable 15 by the brake lever 19 is substantially constant. This permits the rider to be accustomed to the amount of force applied in response to a given amount of pressure on the brake lever 19.

Thus, there is provided a reliable, inexpensive means of increasing the amount of force a rider can exert on the brake caliper of a bicycle.

I claim:

1. A bicycle brake cable assembly, comprising:
   a stem, comprising:
     a substantially vertical shaft;
     an elongate arm extending substantially horizontally outward from said shaft; and
     a clamp secured to the end of said arm opposite said shaft for securing and supporting a pair of handlebars;
   a housing extending from said shaft or said arm, said housing including a pair of sides horizontally spaced from one another;
   a pin, at least a portion of which is secured between the sides of said housing defining an axis of rotation;
   a device mounted on and rotatable about said pin, said device comprising:
     a generally triangular body including a horizontal bore having a diameter larger than the diameter of said pin, through which said pin extends;
     a first fork extending from said body for retaining a brake cable connected to a brake lever, said first fork including a pair of curved prongs, wherein the space between the prongs of said first fork forms a vertical slot and one side of said prongs of said first fork forms a partial cylindrical surface; and
     a second fork spaced from said first fork extending from said body for retaining a brake cable connected to a brake caliper, said second fork including a pair of curved prongs, wherein the space between the prongs of said second fork forms a vertical slot, the side of said prongs of said second fork facing said first fork forms a partial cylindrical surface, and the ratio between the perpendicular distance between said axis of rotation and the axis of the partial cylindrical surface formed by said prongs of said first fork and the perpendicular distance between said axis of rotation and the axis of the partial cylindrical surface formed by said prongs of said second fork is between 7 to 6 and 3 to 2.

2. A bicycle brake cable assembly, comprising:
   a stem, comprising:
     a substantially vertical shaft;
     an elongate arm extending substantially horizontally outward from said shaft; and
     a clamp secured to the end of said arm opposite said shaft for securing and supporting a pair of handlebars;
   a housing depending from said arm, said housing including a pair of sides horizontally spaced from one another:
   a pin, at least a portion of which is secured between the sides of said housing defining an axis of rotation;
   a device mounted on and rotatable about said pin, said device comprising:
     a generally triangular body including a bore having a diameter larger than the diameter of said pin, through which said pin extends;
     a first portion for retaining the end of a cylinder secured to a brake cable connected to a brake lever, said first portion comprising a first fork having a pair of curved prongs, wherein the space between the prongs of said first fork forms a slot and said first fork forms a partial cylindrical surface;
     a second portion for retaining the end of a cylinder secured to a brake cable connected to a brake caliper, said second portion comprising a second fork having a pair of curved prongs, wherein the space between the prongs of said second fork forms a slot, the distal ends of said prongs of said first fork curve toward the distal ends of said second fork, the side of said prongs of said second fork facing said second fork forms a partial cylindrical surface, and the ratio between the distance between said axis of rotation and the axis of the partial cylindrical surface formed by said prongs of said first fork and the distance between said axis of rotation and the axis of the partial cylindrical surface formed by said prongs of said second fork is approximately 4 to 3; and
   a stop secured to said underside of said arm for preventing the movement of an end of a sheath relative said housing.

3. A bicycle brake cable assembly, comprising:
   a stem, comprising:
     a substantially vertical shaft;

an elongate arm extending substantially horizontally outward from said shaft; and
a clamp secured to the end of said arm opposite said shaft for securing and supporting a pair of handlebars;
a housing depending from said arm, said housing including a pair of sides horizontally spaced from one another:
a pivot secured between the sides of said housing defining an axis of rotation; and
a device rotatable about said pivot, said device comprising:
a first portion including a partial cylindrical surface for retaining a cylinder secured to a brake cable connected to a brake lever;
a second portion for retaining a cylinder secured to a brake cable connected to a brake caliper, wherein the ratio between the distance between said axis of rotation and the axis of a cylinder retained by said first potion and the distance between said axis of rotation and the axis of a cylinder retained by said second portion is between 7 to 6 and 3 to 2.

4. A bicycle brake cable device, comprising:
a body including a horizontal bore;
a first portion for retaining the end of a cylinder secured to a brake cable connected to a brake lever, said first portion comprising a first fork having a pair of curved prongs, wherein the space between the prongs of said first fork forms a vertical slot and one side of said prongs of said first fork forms an internal partial cylindrical surface; and
a second portion for retaining the end of a cylinder secured to a brake cable connected to a brake caliper, said second portion comprising a second fork having a pair of curved prongs, wherein the space between the prongs of said second fork forms a vertical slot and said second fork forms a partial cylindrical surface, wherein the ratio between the distance between the axis of the bore and the axis of the partial cylindrical surface formed by said prongs of said first fork and the distance between the axis of the bore and the axis of the partial cylindrical surface formed by the prongs of the second fork is greater than one.

* * * * *